United States Patent
Eliash et al.

(10) Patent No.: US 11,288,011 B2
(45) Date of Patent: Mar. 29, 2022

(54) NON-VOLATILE MEMORY ARRAY WITH WRITE FAILURE PROTECTION FOR MULTI-LEVEL CELL (MLC) STORAGE ELEMENTS USING COUPLED WRITES

(71) Applicant: Western Digital Technologies, Inc., San Jose, CA (US)

(72) Inventors: Tomer Tzvi Eliash, Sunnyvale, CA (US); Alexander Bazarsky, Holon (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/831,517

(22) Filed: Mar. 26, 2020

(65) Prior Publication Data
US 2021/0303203 A1    Sep. 30, 2021

(51) Int. Cl.
*G06F 3/06*      (2006.01)

(52) U.S. Cl.
CPC .......... *G06F 3/0659* (2013.01); *G06F 3/0619* (2013.01); *G06F 3/0688* (2013.01)

(58) Field of Classification Search
CPC .... G06F 3/0619; G06F 3/0688; G06F 3/0659; G06F 12/0246
See application file for complete search history.

(56) References Cited

U.S. PATENT DOCUMENTS

| | | | |
|---|---|---|---|
| 7,158,421 B2 | 1/2007 | Li et al. | |
| 7,206,230 B2 | 4/2007 | Li et al. | |
| 8,432,740 B2 | 4/2013 | Li et al. | |
| 10,133,645 B2 | 11/2018 | Shapira et al. | |
| 2015/0324119 A1* | 11/2015 | Romanovsky | G06F 3/065 711/103 |
| 2017/0097869 A1 | 4/2017 | Sharon et al. | |
| 2017/0102991 A1* | 4/2017 | Haratsch | H03M 13/3707 |

* cited by examiner

*Primary Examiner* — Edward J Dudek, Jr.
(74) *Attorney, Agent, or Firm* — Loza & Loza, LLP; Gabriel Fitch

(57) ABSTRACT

Methods and apparatus for use with non-volatile memory (NVM) arrays having single-level cell (SLC) layers and multi-level cell (MLC) layers, such as triple-level cell (TLC) layers, provide for a coupled SLC/MLC write operation where SLC write protection is combined into a MLC write flow. In an illustrative example, data is written concurrently to SLC and TLC. The SLC data provides a backup for the TLC data in the event the TLC data is defective. The TLC data is verified using, for example, write verification. If the data is successfully verified, the SLC block can be erased or otherwise overwritten with new data. If not, the SLC block can be used to recover the data for storage in a different TLC block. The coupled SLC/MLC write operation may be performed in conjunction with a quick pass write (QPW).

22 Claims, 11 Drawing Sheets

US 11,288,011 B2

NON-VOLATILE MEMORY ARRAY WITH WRITE FAILURE PROTECTION FOR MULTI-LEVEL CELL (MLC) STORAGE ELEMENTS USING COUPLED WRITES

FIELD

The disclosure relates, in some embodiments, to non-volatile memory (NVM) arrays. More specifically, but not exclusively, the disclosure relates to methods and apparatus for protecting data stored with multi-level cell (MLC) storage elements of NVM arrays.

INTRODUCTION

In a variety of consumer electronics devices, solid state devices (SSDs) incorporating non-volatile memories (NVMs) are replacing or supplementing conventional rotating hard disk drives for mass storage. SSDs with NVM arrays may include multiple tiers of storage with different performance, endurance characteristics, and costs. SSD products can include, for example, NVM arrays with single-level cell (SLC) layers and multi-level cell (MLC) layers such as triple-level cell (TLC) layers. Write validation and protection procedures are employed to maintain data integrity. For example, data written to an NVM array may be read back to verify the data was correctly written and, if it was not written correctly, the data may be recovered from another device, such as from dynamic random access memory (DRAM). Aspects of the present disclosure are directed, e.g., to validating and protecting data written to MLC layers.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One embodiment of the disclosure provides a memory device that includes: a non-volatile memory (NVM) array including single-level cell (SLC) elements and multi-level cell (MLC) elements; and a processor configured to perform a coupled SLC/MLC write to write data to selected SLC elements and to write the same data in parallel to a selected MLC element, determine whether the data written to the selected MLC element is correct, and release the data in the selected SLC elements for overwrite in response to a determination that the data written to the selected MLC element is correct.

Another embodiment of the disclosure provides a method for use with memory array that includes SLC elements and MLC elements. The method includes: performing a coupled SLC/MLC write comprising writing data to selected SLC elements and writing the same data in parallel to a selected MLC element; verifying the data written to the selected MLC element; and releasing the data in the selected SLC elements for overwrite in response to successful verification of the data written to the selected MLC element.

Yet another embodiment of the disclosure provides an apparatus for use with a memory array that includes SLC elements and MLC elements. The apparatus includes: means for performing a coupled SLC/MLC write to write data to selected SLC elements and to write the same data in parallel to a selected MLC element; means for verifying the data written to the selected MLC element; and means for releasing the data in the selected SLC elements for overwrite in response to successful verification of the data written to the selected MLC element.

DETAILED DESCRIPTION

Figure 1:
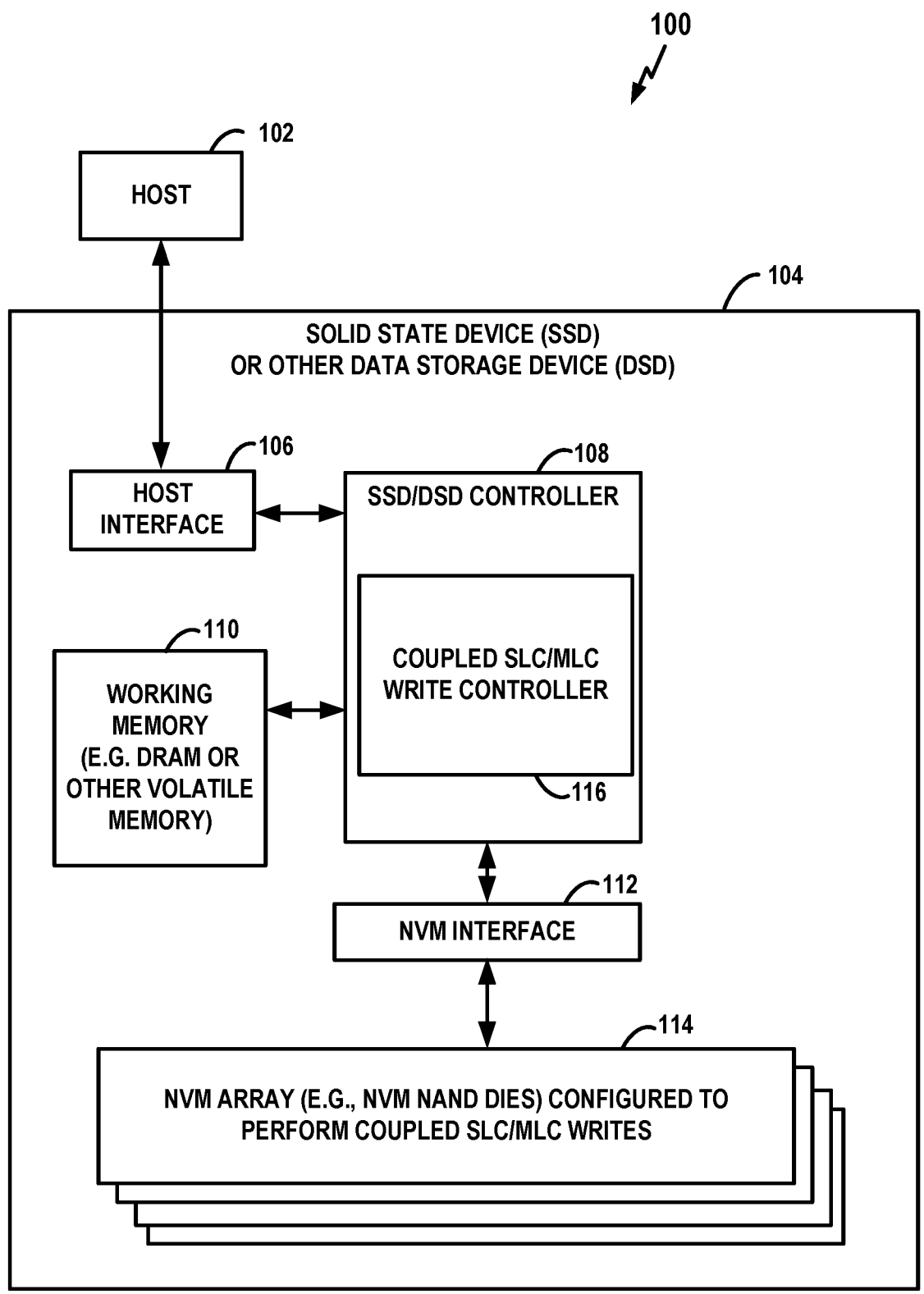
FIG. 1 is a schematic block diagram illustrating a data storage device in the form of an exemplary solid state device (SSD) having an NVM array configured with for coupled SLC/MLC write operations.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The examples herein relate to non-volatile memory (NVM) arrays, and to data storage devices or apparatus for controlling the NVM arrays, such as a controller of a data storage device, such as an SSD, and in particular to solid-state memory storage devices such as those that use NAND flash memory (herein "NANDs"). A NAND is a type of non-volatile storage technology that does not require power to retain data. It exploits negative-AND logic, i.e. NAND logic. For the sake of brevity, an SSD having one or more NAND dies will be used as a non-limiting example of a data storage device (DSD) below in the description of various embodiments. It is understood that at least some aspects described herein may be applicable to other forms of data storage devices as well. For example, at least some aspects described herein may be applicable to phase-change memory (PCM) arrays, magneto-resistive random access memory (MRAM) arrays and resistive random access memory (ReRAM) arrays. In addition, the various embodiments may be used in various devices which may include some combination of processing elements and memory/data storage elements, including the NVM arrays constructed/configured in accordance with the described embodiments.

Overview

As noted above, SSDs with NVM arrays may include multiple tiers of storage with different performance, endurance characteristics, and costs. SSD products can include, for example, NVM arrays with single-level cell (SLC) layers and multi-level cell (MLC) layers such as triple-level cell (TLC) layers. (Note that within some of the literature, MLC refers only to two-level cells. Herein, MLC instead refers to any multi-level cell (or multi-layer cell), including two-level cells, three-level cells, four-level cells, etc. Note also that the SLC storage elements and the MLC storage elements may be formed on separate dies that are part of the same NVM array.) Defects in a die, including physical changes over time to a die, can interfere with the reliable writing of data to the NVM storage elements of the die. Write validation procedures may be employed to maintain data integrity, such as by reading back data to verify that the data was correctly written (programmed). Note that within the NVM arts, data that is written to an NVM array (e.g., a flash NAND TLC array) is often referred to as being "programmed" to the array. Herein, for clarity, the term "write" is used in many of the descriptions. The term programmed is also be used where appropriate, such as when referring to the individual programming of states within a TLC storage element.

In some examples, in order to validate the data after a write process, write verification components read back the written data and check a FBC (failed bit count, which may also be referred to as a flipped bit count). So long as the FBC does not exceed a threshold indicative of correctly written data, the data is deemed to be good data by the write verification components. If the FBC exceeds the threshold, the write verification components thus detected an error and the SSD recovers the data and writes the data elsewhere in the NVM array. However, unless the SSD maintains a copy of the data to permit retrieval, the data will not available after the write stage to permit re-writing the data.

A straightforward but relatively expensive solution is to generate exclusive-OR (XOR) signatures of written data and maintain the signatures in a dynamic random access memory (DRAM) of the SSD until the written data is declared as "good," e.g., the written data is validated by a write verification process. In many current SSDs with NAND NVM arrays, each data chunk that needs to be saved (and thus protected) can be quite large, thus requiring a large DRAM, which increases overall cost of the SSD as well as consuming more power and requiring more size and space. Another option is to write the XOR signatures into SLC blocks on the NVM die. (See, for example, U.S. Pat. No. 10,133,645 to Shapira et al.) This method avoids the need to consume large amounts of RAM and, since writing data to SLC is relatively quick, overall performance degradation can be reduced, yet there is still some performance degradation. Yet another option is to write all data twice. Since the odds that more than one NVM array block will be damaged by defects at the same time (causing write errors) is quite low, such backup is generally reliable. However, such a method reduces the overall performance of the SSD since all data is written twice. The method can also consume a large portion the NVM array, thus reducing the amount of storage available to the user.

Herein, methods and apparatus are disclosed for correcting write errors in NVM arrays. Briefly, in some examples, SLC write protection is combined into a MLC write flow (such as TLC write flow). For example, data is written to MLC while the same data is concurrently written to SLC. The SLC data thereby provides a backup for the MLC data in the event the MLC block includes defects causing a high FBC. The MLC data is verified using, for example, write verification where a series of write verification pulses are applied to read back the stored data. If the MLC data is successfully verified, the SLC block can be erased or otherwise overwritten with new data. If the MLC data is not successfully verified, the data is recovered from the SLC block. Herein, by "concurrently," it is meant that the data is written at about the same time (or more or less simultaneously) to both MLC and SLC. In practice, a sequence of pulses are employed to store data to MLC and the concurrent SLC programming pulse (or pulses) may not occur at the exact same instant as corresponding MLC pulses. Rather, the SLC pulse (or pulses) are concurrent in the sense that they are applied during the interval of time in which the sequence of MLC pulses are applied. In some examples herein, a common charge pump is used to generate pulses for applying to SLC and MLC blocks and, in those examples, simultaneous pulses may be applied at the same time to the SLC and MLC blocks.

The SLC write may be coupled to a TLC write (as a "coupled SLC/TLC write") so that one command can initiate both the TLC and the SLC write. In this manner, overall write performance is not significantly impaired, data is protected during the write process, and no extra RAM is consumed for saving a copy of the data for recovery. In other examples, an SLC write may be coupled with a QLC write (as a "coupled SLC/QLC write) or, more generally, the SLC write may be coupled with any MLC write (as a "coupled SLC/MLC write"). In some examples, an internal address decoder of the NVM array is configured to select two storage blocks at the same time. For example, the SSD controller of the NVM array may be configured to send an additional address to the NVM array providing an SLC protection block (parallel) address in addition to the TLC block address for storing the data so that the NVM array can store data in parallel in the SLC block and the TLC block.

In some examples where a TLC write is performed, the TLC write procedure uses a code block for programming bits into the upper, middle and lower pages of a TLC block stored in code block latches. Information within the code block (representing "states") is programmed into TLC pages using a series of pulses of increasing voltage provided by a charge pump. After each state is programmed, the corresponding bit in the code block latch is switched to a value to indicate that further programming of that particular state is inhibited. That is, once a particular state is programmed into a TLC element or cell, the corresponding information is lost from the code block latch. Accordingly, methods are described herein for triggering programming of the corresponding SLC block before the information is lost from the TLC code block. As will be explained, in an illustrative example, the last pulse used to program a particular state of the TLC (such as the A state) triggers an SLC programming pulse using the common charge pump. In the illustrative examples, a quick pass write (QPW) procedure, which is discussed in more detail in U.S. Pat. Nos. 7,158,421 and 7,206,230, determines the last pulse for programming each state and can be used for triggering the SLC programing pulse. (U.S. Pat. Nos. 7,158,421 and 7,206,230 are incorporated by reference herein.)

In devices where the same charge pump is used to generate pulses for both an SLC page and an MLC page, a main reason of waiting to use the last pulse is to allow the charge pump to reach a high voltage before it is triggered. In these devices, a single pulse is used to program SLC, whereas MLC is programmed using a series of pulses that gradually "push" data into the cell (such as by using QPW). Since the charge pump is common to both the SLC page and to the MLC page, if pulses were instead applied immediately at the beginning of an MLC programming operation, the pulses would be relatively weak and hence might not program the corresponding SLC page. By waiting until the last moment (e.g. by waiting until the last pulse for programming the current MLC state is generated), the pulse is therefore the strongest and should successfully program the SLC page as well as the MLC state. Hence, the SLC page is properly programmed before the data in the latches is lost (via an inhibition process).

As these methods employ extra blocks in the NVM array (i.e. SLC blocks that are temporarily used until they can be released following verification of the TLC write), the NVM device might run out of blocks in rare cases in some implementations. Therefore, in some examples, the coupled SLC/TLC write is opportunistic. That is, the NVM device will only perform a coupled SLC/TLC write if the device has a sufficient number of free blocks. Since the data storage controller knows the amount of free blocks in the NVM device, whenever there are enough blocks that can be coupled (via a coupled SLC/TLC write), the data storage controller uses the blocks for the protection. If there are not enough blocks, a XOR snapshot may be used instead to save the data (in which a XOR copy of the data is stored in DRAM by the data storage controller or stored in a SLC block). Note that since an NVM device rarely runs out of blocks (especially since there are often more blocks than the exported capacity listed for the NVM device), it is unlikely the XOR snapshot protection procedure will need to be used and so, in some examples, XOR snapshot circuitry is simply omitted from the device.

In many of the illustrative embodiments, a significant advantage of combining SLC write protection into a MLC write flow for concurrent processing is that the concurrent processing reduces or eliminates overhead that otherwise might be required if write protection were instead performed either before or after the programming of the data. For instance, in a system that provides write protection by storing a XOR snapshot of the data in DRAM, overhead processing may be needed to store the snapshot in the DRAM. In a system that provides write protection by storing the XOR snapshot in a different portion of the NVM, overhead processing may also be needed to generate and store the XOR snapshot, either before the data is stored in MLC or afterwards, possibly degrading performance. By instead including the SLC write protection within the MLC write flow, the data is stored in parallel and no overhead processing is required before or after the MLC write. In this manner, the SLC protection is "hidden" within the MLC write flow and does not degrade system performance. Other benefits or advantages may be achieved as well.

Exemplary Devices, Systems and Procedures

FIG. 1 is a block diagram of a system 100 including an exemplary SSD having an NVM configured to perform coupled SLC/MLC writes (such as coupled SLC/TLC writes). More specifically, the system 100 includes a host 102 and a SSD 104 (or other DSD) coupled to the host 102. The host 102 provides commands to the SSD 104 for transferring data between the host 102 and the SSD 104. For example, the host 102 may provide a write command to the SSD 104 for writing data to the SSD 104 or read command to the SSD 104 for reading data from the SSD 104. The host 102 may be any system or device having a need for data storage or retrieval and a compatible interface for communicating with the SSD 104. For example, the host 102 may a computing device, a personal computer, a portable computer, a workstation, a server, a personal digital assistant, a digital camera, or a digital phone as merely a few examples.

The SSD 104 includes a host interface 106, an SSD or DSD controller 108, a working memory 110 (such as DRAM or other volatile memory), an NVM interface 112, and an NVM array 114 having one or more dies configured to perform coupled SLC/MLC writes. The host interface 106 is coupled to the controller 108 and facilitates communication between the host 102 and the controller 108. The controller 108 is coupled to the volatile memory 110 as well as to the NVM array 114 via the NVM interface 112. The host interface 106 may be any suitable communication interface, such as a Non-Volatile Memory express (NVMe) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an IEEE 1394 (Firewire) interface, or the like. In some embodiments, the host 102 includes the SSD 104. In other embodiments, the SSD 104 is remote from the host 102 or is contained in a remote computing system communicatively coupled with the host 102. For example, the host 102 may communicate with the SSD 104 through a wireless communication link. The NVM array 114 may include multiple dies, some of which are configured for SLC storage and others configured for MLC storages (such as TLC storage).

Although, in the example illustrated in FIG. 1, SSD 104 includes a single channel between controller 108 and NVM array 114 via interface 112, the subject matter described herein is not limited to having a single memory channel. For example, in some NAND memory system architectures, two, four, eight or more NAND channels couple the controller and the NAND memory device, depending on controller capabilities. In any of the embodiments described herein, more than a single channel may be used between the controller and the memory die, even if a single channel is shown in the drawings. The controller 108 may be implemented in a single integrated circuit chip and may communicate with different layers of memory in the NVM 114 over one or more command channels.

The controller 108 controls operation of the SSD 104. In various aspects, the controller 108 receives commands from the host 102 through the host interface 106 and performs the commands to transfer data between the host 102 and the NVM array 114. Furthermore, the controller 108 may manage reading from and writing to volatile memory 110 for performing the various functions effected by the controller and to maintain and manage cached information stored in the volatile memory 110.

The controller 108 may include any type of processing device, such as a microprocessor, a microcontroller, an embedded controller, a logic circuit, software, firmware, or the like, for controlling operation of the SSD 104. In some aspects, some or all of the functions described herein as being performed by the controller 108 may instead be performed by another element of the SSD 104. For example, the SSD 104 may include a microprocessor, a microcontroller, an embedded controller, a logic circuit, software, firmware, application specific integrated circuit (ASIC), or any kind of processing device, for performing one or more of the functions described herein as being performed by the controller 108. According to other aspects, one or more of the functions described herein as being performed by the controller 108 are instead performed by the host 102. In still further aspects, some or all of the functions described herein as being performed by the controller 108 may instead be performed by another element such as a controller in a hybrid drive including both non-volatile memory elements and magnetic storage elements.

The working memory 110 may be any suitable memory, computing device, or system capable of storing data. For example, working volatile memory 110 may be ordinary RAM, DRAM, double data rate (DDR) RAM, static RAM (SRAM), synchronous dynamic RAM (SDRAM), a flash storage, an erasable programmable read-only-memory (EPROM), an electrically erasable programmable ROM (EEPROM), or the like. In various embodiments, the controller 108 uses the working memory 110, or a portion thereof, to store data during the transfer of data between the host 102 and the NVM array 114. For example, the working memory 110 or a portion of the volatile memory 110 may be a cache memory. The NVM array 114 receives data from the controller 108 via the NVM interface 112 and stores the data. The NVM array 114 may be any suitable type of non-volatile memory that includes SLC and MLC storage elements or the equivalent, such as NAND-type flash memory array dies or the like. In some embodiments, working memory 110 may be replaced by a non-volatile memory such as MRAM, PCM, ReRAM, etc. to serve as a working memory for the overall device.

In the example of FIG. 1, the SSD controller 108 may include hardware, firmware, software, or any combinations thereof that provide a coupled SLC/MLC write controller 116 for use with the NVM array 114. For example, the SSD controller 108 of the NVM array 114 may be configured to send an additional address to the NVM array 114 providing an SLC protection block (parallel) address in addition to a MLC block address for storing the data so that the NVM array 114 can store data in parallel in SLC blocks and MLC blocks.

Although FIG. 1 shows an exemplary SSD and an SSD is generally used as an illustrative example in the description throughout, the various disclosed embodiments are not necessarily limited to an SSD application/implementation. As an example, the disclosed NVM array and associated processing components can be implemented as part of a package that includes other processing circuitry and/or components. For example, a processor may include, or otherwise be coupled with, embedded NVM array and associated circuitry and/or components for coupled SLC/MLC writes that are described herein. The processor could, as one example, off-load certain coupled SLC/MLC writes tasks to the NVM and associated circuitry and/or components. As another example, the SSD controller 108 may be a controller in another type of device and still be configured to perform or control coupled SLC/MLC writes and perform some or all of the other functions described herein. In some examples, the SSD performs or controls the coupled SLC/MLC writes using the NVM array 114. In other examples, the NVM array 114 includes on-chip logic to perform the coupled SLC/MLC writes. In the following, an example will be described where the NVM array 114 includes one or more dies that include suitable on-chip logic (using, e.g., under-the-array circuitry).

Figure 2:
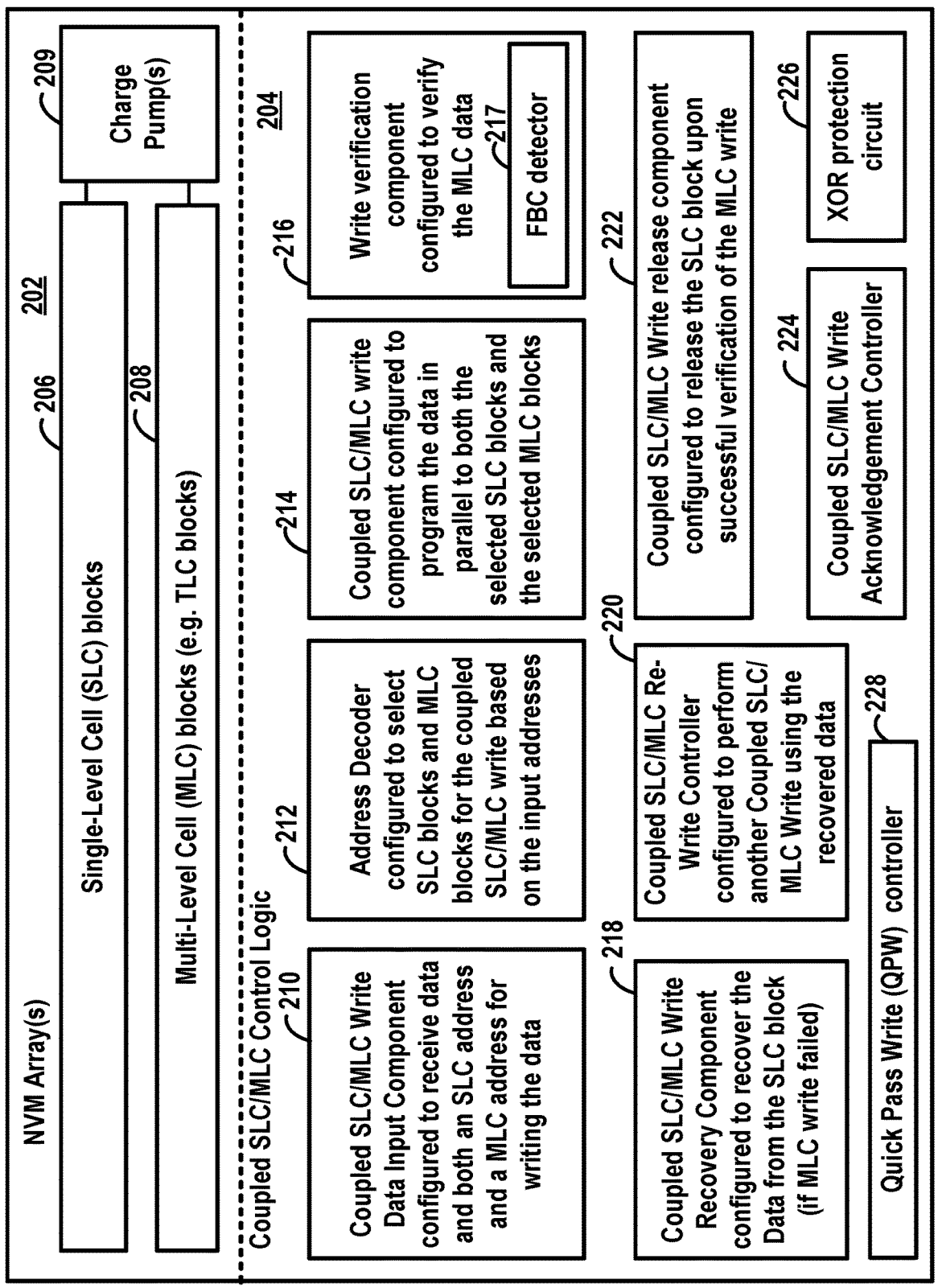
FIG. 2 is a schematic block diagram illustrating an exemplary NVM array having components for performing coupled SLC/MLC write operations.

FIG. 2 is a block diagram of an exemplary NVM array 200 that includes NVM storage arrays 202 (which may be formed on separate dies) and coupled SLC/MLC control logic 204, which may be configured using under-the-array or next-to-the-array (or other extra-array) circuitry within one or more of the dies or within circuitry connected to the dies. Not all circuit or memory components that might be used in a practical NVM array are illustrated in the figure, such as voltage regulation components, clocks, etc. Rather only selected components and circuits are shown, summarized as block or schematic diagrams. The exemplary NVM arrays 202 include SLC blocks 206 and MLC blocks 208 (e.g., TLC blocks), which may be coupled to one or more charge pumps 209. In some examples, a common charge pump 209 generates pulses for applying to both the SLC blocks 206 and the MLC blocks 208. The coupled SLC/MLC control logic 204 includes components for performing coupled SLC/MLC writes using the SLC blocks 206 and the MLC blocks 208, for verifying the write to the MLC blocks, and for responding to any MLC write failures (due, e.g., to defects in the NVM die 200).

The coupled SLC/MLC control logic 204 includes a coupled SLC/MLC write data input component 210 that includes circuitry configured to receive data from the SSD controller for storage in the NVM arrays 202, along with both an SLC address and a MLC address for writing the data. An address decoder 212 includes circuitry configured to select one or more SLC blocks within SLC blocks 206 and one or more MLC blocks within MLC blocks 208 for the coupled SLC/MLC write based on the input addresses. Note that for a TLC example, since a single TLC block stores three times the data as a single SLC block, three SLC blocks are selected for each TLC block to store the data. A coupled SLC/MLC write component 214 includes circuitry configured to write (program) the data in parallel to both the selected SLC blocks and the selected MLC blocks. A write verification component 216 includes circuitry configured to verify the MLC data using FBC data measured using a FBC detector 217. For example, the write verification component 216 may apply a series of write verification pulses to the MLC blocks in which the data is stored to read out the data for comparison against the same data in the SLC blocks to detect a FBC for comparison against a detection threshold indicative of a storage error.

A coupled SLC/MLC write recovery component 218 includes circuitry configured to recover the data from the SLC block (if the MLC write failed). For example, the write recovery component 218 may read out the SLC data and store it in a latch for use in with another coupled SLC/MLC write. A coupled SLC/MLC re-write controller 220 includes circuitry configured to perform another coupled SLC/MLC write using the recovered data to re-store the data in other locations within the NVM arrays 202. Write verification is again performed using the write verification component 216 and, if another write error is detected, the data may be re-stored yet again in another location. However, in practical applications, more than two coupled SLC/MLC writes are rarely needed for successful storage of data. A coupled SLC/MLC write release component 222 includes circuitry configured to release the SLC block where the data was stored upon successful verification of the MLC write. Once released, the SLC block can be overwritten by other data. A coupled SLC/MLC write acknowledgement controller 224 is configured to generate a suitable acknowledgement (e.g. an ACK signal) of the successful write for sending to the SSD or a negative acknowledgment (e.g. a NACK signal) if for some reason the NVM die is unable to successfully store the data.

Insofar as the release of the data in the SLC block is concerned, once the data programmed to the MLC block has been validated, the data in the SLC block can be released. In some examples, even after validation, the data is retained for some amount of time, which may be referred to as a "damage window" (during which time data for more than a single page may be retained in the event is it still needed). Note also that in case a single programming pulse is not strong enough for the SLC programming, the NVM device may keep the "protection block" page selected for entire state programming (e.g. if state A requires three MLC pulses, the protection block is kept open for three pulses as well). Since this method employs extra blocks in the array (which are cycled with the MLC data), the NVM device might run out of blocks. Therefore, as noted above, the method is opportunistic. That is, the NVM device will only perform a coupled SLC/MLC write if the device has a sufficient number of free blocks. Since the data storage controller knows the amount of free blocks in the NVM device, whenever there are enough blocks that can be coupled (via a coupled SLC/MLC write), the data storage controller uses the blocks for the protection. If there are not enough blocks, a XOR snapshot may be taken instead using a XOR protection circuit 226 to save the data (in which a XOR copy of the data is stored in SLC array 206). Since an NVM device rarely runs out of blocks, especially since there are more blocks than the exported capacity listed for the NVM device, it is unlikely that the XOR snapshot protection procedure will need to be used often. Hence, in some examples, the XOR protection circuit is omitted. As also noted above, in some examples, a QPW is used to write (program) data into the MLC blocks and so a QPW controller 228 is illustrated in FIG. 2. QPW-based embodiments are discussed below.

Figure 3:
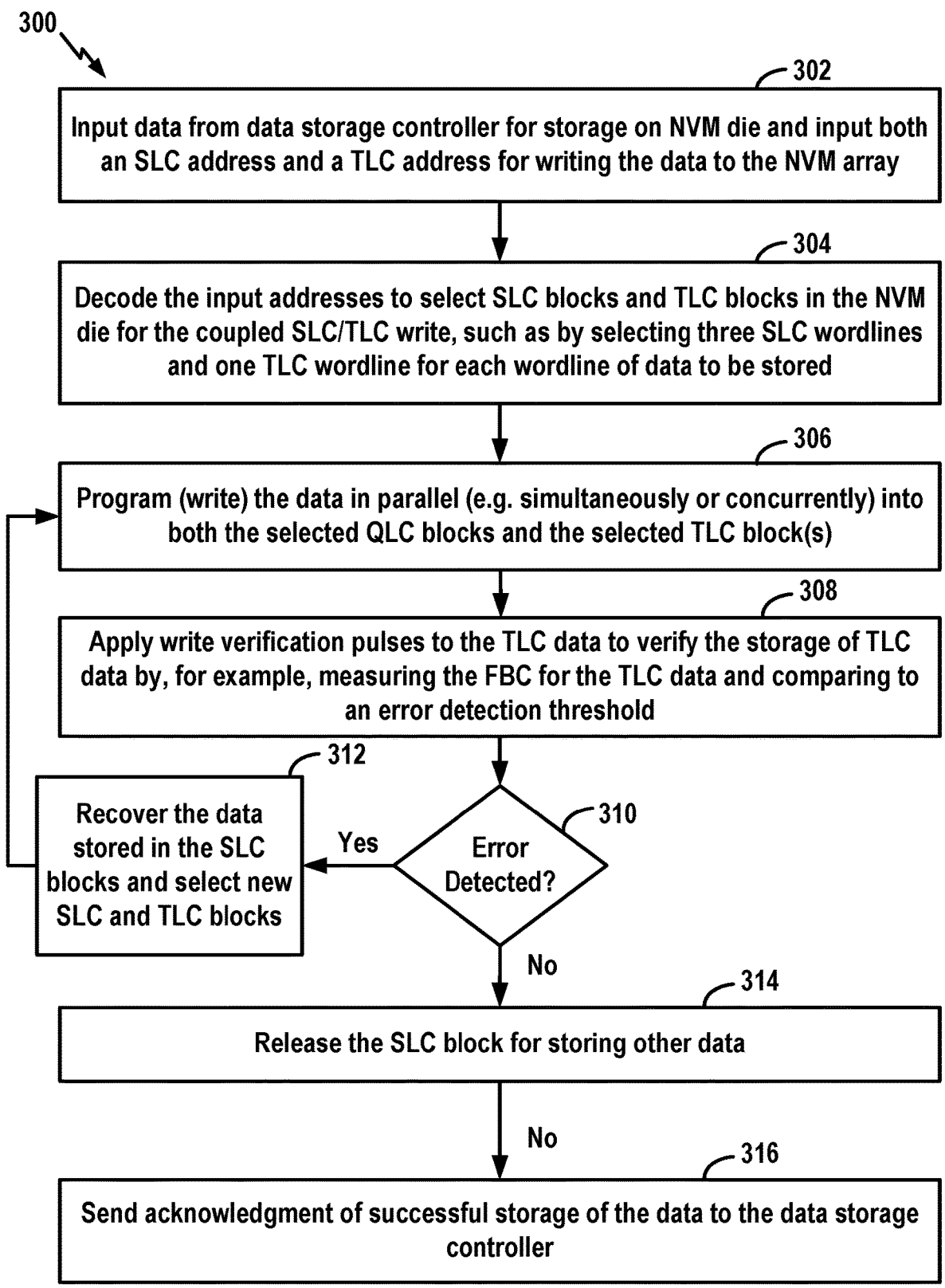
FIG. 3 is a flowchart illustrating an exemplary method that may be performed by the NVM array of FIG. 2 to implement a coupled SLC/TLC write.

FIG. 3 is a flow diagram 300 illustrating a procedure that may be performed by the NVM array 200 of FIG. 2 or other suitably-equipped die or die(s) where the MLC storage elements are TLC storage elements. Beginning at block 302 of FIG. 3, the NVM array receives or inputs data from a data storage controller for storage in the NVM array, along with both an SLC address and a TLC address for writing the data. At block 304, the NVM array decodes the addresses and selects one or more SLC blocks and one or more TLC blocks for the coupled SLC/TLC write based on the input addresses, such as by selecting three SLC wordlines and one TLC wordline for each wordline of data to be stored. At block 306, the NVM array programs (writes) the data in parallel to both the selected SLC blocks and the selected TLC blocks. At block 308, the NVM die applies write verification pulses to the TLC data to verify successful storage of the TLC data by, for example, measuring the FBC for the stored TLC data and comparing the FBC against an error detection threshold. The read data may be compared, in some examples, to the SLC data to detect any differences indicative of errors.

At decision block 310, if an error is detected in the TLC block data, processing continues with block 312 to recover the data by reading the data from the SLC block and selecting new SLC and TLC blocks to re-store the data. Processing then returns to block 306 where the NVM array performs another coupled SLC/TLC write at the new storage location. Write verification is again performed by the NVM array at block 308 and, if another write error is detected at block 310, the data may be re-stored yet again in another location. Assuming though, that the data is now successfully stored, processing continues to block 314 where the NVM array releases the SLC block so that the SLC block can be overwritten by other data. At block 316, the NVM array sends a coupled SLC/TLC write acknowledgement to the data storage controller. Although not specifically shown in FIG. 3, if the NVM array is unable to successfully store the data despite repeated attempts, a suitable error signal may be sent to the data storage controller (such as the NACK signal discussed with references to FIG. 2).

Figure 4:
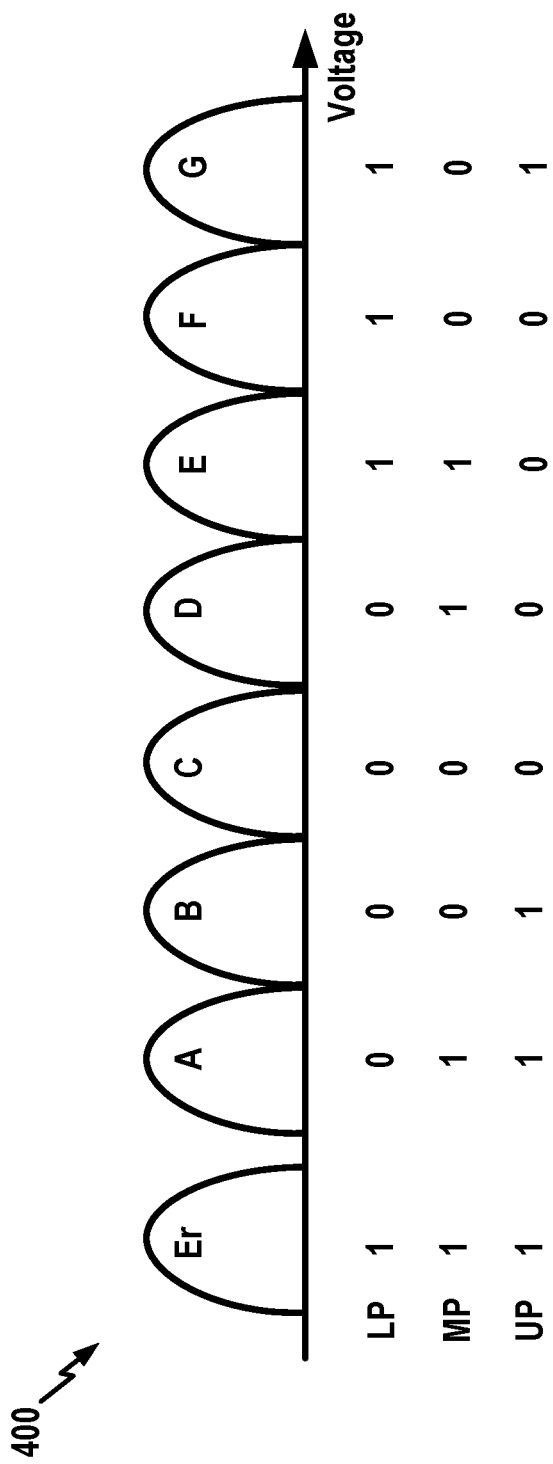
FIG. 4 is a schematic illustration of a TLC data storage scheme.

FIG. 4 illustrates a TLC data storage scheme 400 and depicts a mapping of bits of an upper page (UP), a middle page (PM), and a lower page (LP) to an erase ("Er") state, an "A" state, a "B" state, a "C" state, a "D" state, an "E" state, an "F" state, and a "G" state. A most significant bit position may indicate a value of the lower page and a least significant bit position may indicate a value of the upper page. It should be appreciated that the examples of FIG. 4 are illustrative and that other implementations (e.g., different mappings of bits to states) are within the scope of the disclosure. The information depicted in FIG. 4 may be stored in a wordline (or a block). That is, in some implementations described herein, a word line may correspond to (or may be included in) a TLC partition in memory. Each storage element of a word line may be programmable to a state (e.g., a threshold voltage in a flash configuration or a resistive state in a resistive memory configuration) that indicates one or more values. As shown in FIG. 4, in the illustrative TLC scheme 400, each storage element of a word line may be programmable to a state that indicates three values, such as 0, 1, 1 or 0, 0, 1. The UP, MP and LP data may be stored in corresponding latches: ADL, BDL, and CDL (where DL stands of data latch). While a TLC page is written, the NVM storage logic generates programming pulses that "move" the charges in the TLC cells to certain levels so as to sequentially program the various bits. (Herein, the UP, MP and LP pages of data may also be referred as the ADL, BDL and CDL pages, as they correspond to one another).

Figure 5:
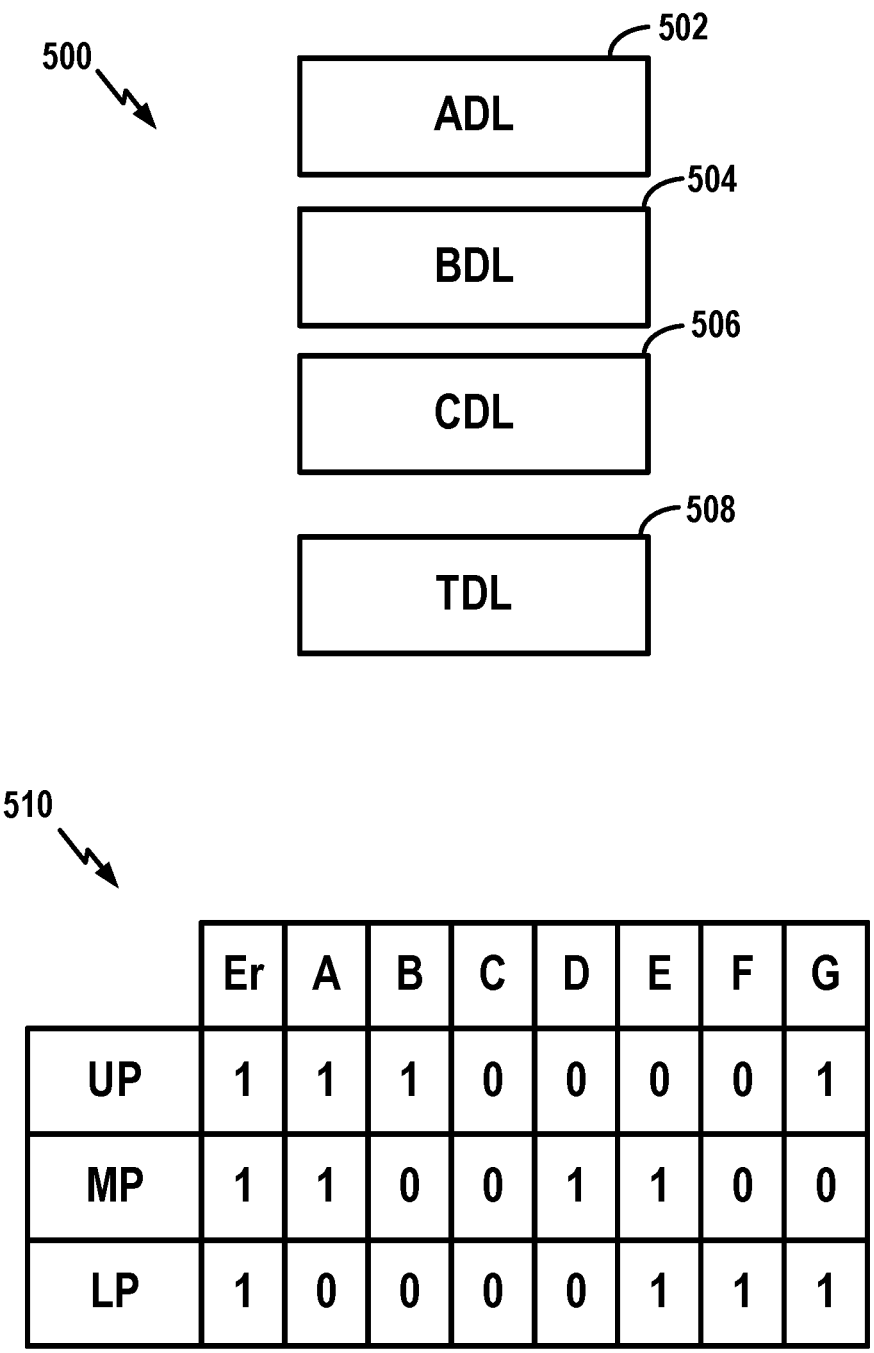
FIG. 5 is a schematic block diagram illustrating exemplary data latches and an exemplary code block.

FIG. 5 illustrates an exemplary set of latches 500, including an ADL 502 (corresponding to the lower TLC page, LP), a BDL 504 (corresponding to the middle TLC page, MP), a CDL 506 (corresponding to the upper TLC page, UP) and a TDL 508, or XDL, which may be used to store QPW information (e.g. QPW "signs" or values) for the QPW write progress, including values for voltage below threshold (VL) and voltage above threshold (VH). FIG. 5 also illustrates a TLC code block 510 UP, MP and LP pages. As shown, each page stores values for the states Er and A-G, where Er refers to the erase state, which may be programmed to TLC cells sequentially using a series of pulses. In the example of FIG. 5, the first four states of the lower page are all zeros. As noted above, in some implementations, information is lost from the TLC code block as data is programmed to TLC because corresponding entries in the TLC code block are switched to values indicating inhibition (which may be the same values representing the Er state). That is, in addition to storing data to be programmed, the ADL, BDL and CDL latches store inhibition "signs" or values.

Figure 6:
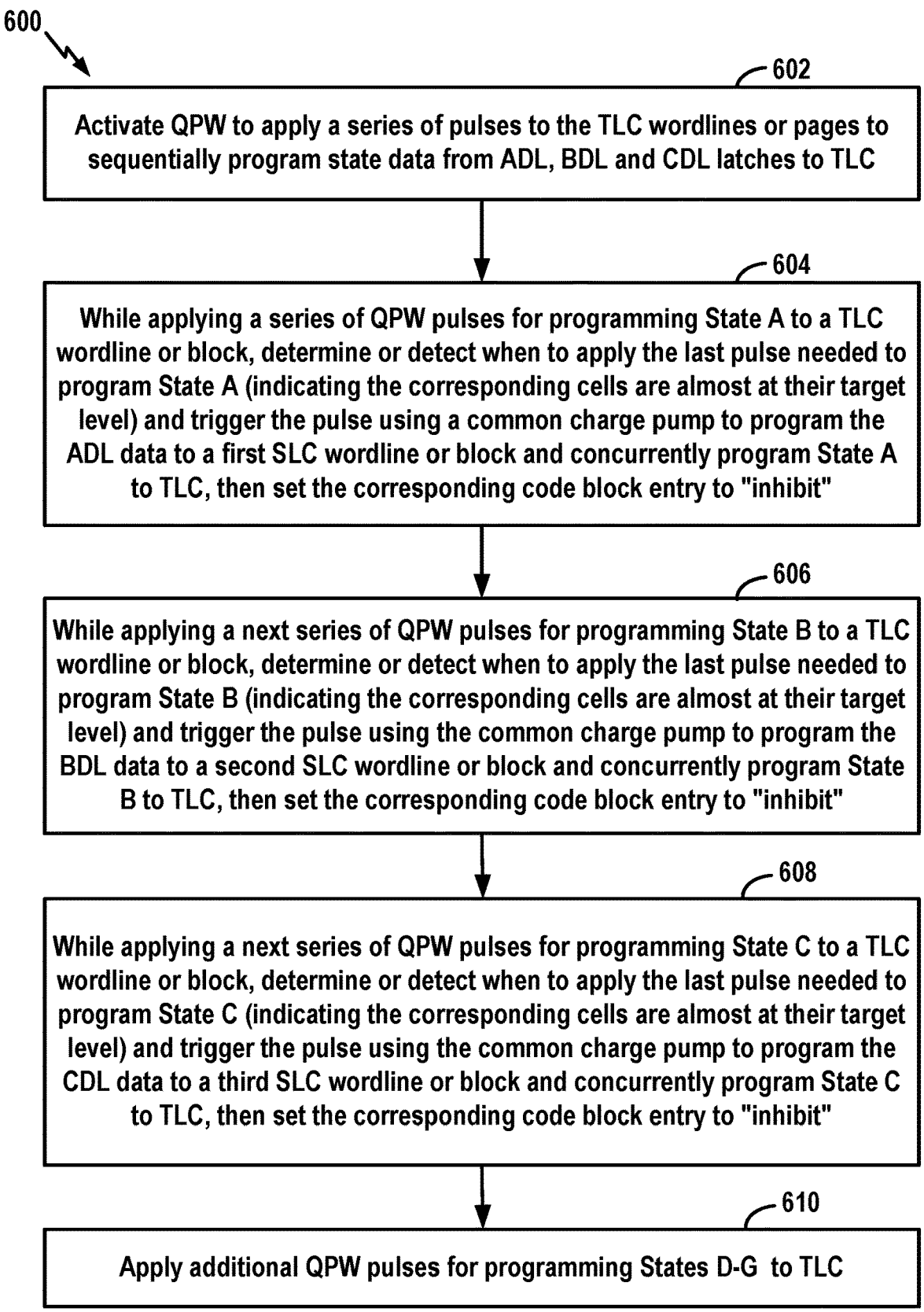
FIG. 6 is a flowchart illustrating an exemplary method that may be performed by the NVM array of FIG. 2 to implement a coupled SLC/TLC write using quick pass write (QPW) operations and a common charge pump.
Figure 7:
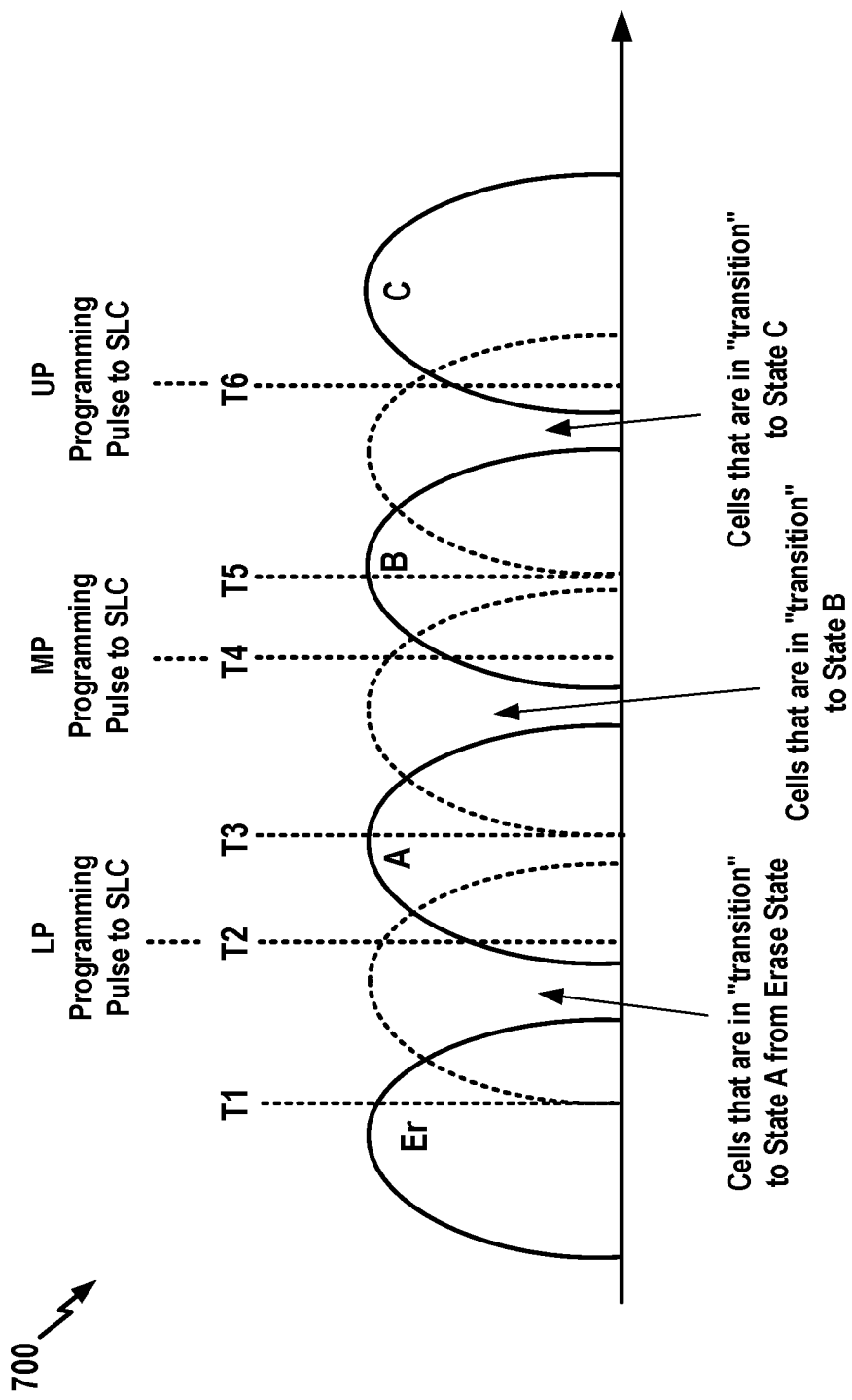
FIG. 7 is a schematic illustration of the timing of the triggering of three SLC pulses based on QPW information for programming three SLC wordlines.

Turning now to FIGS. 6-7, exemplary embodiments are described that exploit QPW or other suitable circuits or procedures to trigger SLC pulses just before the corresponding information in the TLC code block is lost. Briefly, with QPW, each TLC state is programmed using a series of pulses that differ from one another in magnitude (by incrementally smaller amounts) so as to prevent the application of programming pulses that are too large. The device determines whether or not the next pulse will trigger the actual programming of a particular state (such as the A state). This is the last pulse needed to program the state. Once that pulse is applied to the TLC element, the corresponding information for the state maintained in the code block latch is then lost.

As noted above, in devices where SLC is programmed with a single pulse and a common charge pump is used to program both SLC and MLC, it is advantageous to wait to use the last pulse so as to allow the charge pump to reach a high voltage before it is triggered. Since the charge pump is common to both SLC and MLC, if a pulse were instead applied immediately at the beginning of an MLC programming operation (such as at the beginning of a State A programming operation), the pulse might be too weak to effectively program the corresponding SLC page. By waiting until the last feasible moment (e.g. by waiting until the last pulse for programming the current MLC state is generated), the pulse is therefore the strongest and has the best chance of successfully programming the SLC page as well as the current MLC state. In this manner, SLC is properly programmed before the data in the latches is lost (via an inhibition process where the corresponding data entry in the latch is set to the erase state).

The coupled TLC/SLC write may use information from QPW (or other suitable circuits or procedures) to detect or determine when to trigger a programming pulse using the common charge pump so that the pulse can be delivered just before the data would otherwise be lost using a high voltage level. That is, when implementing the coupled SLC/MLC write while employing QPW, the selection of parallel blocks is timed to occur only at a specific time for each of a pair of pages. The first page in the selected block to be protected will have ADL information and is selected in the very last pulse needed for state A. The second page in the selected block will have BDL information and is selected in the very last pulse needed for state B. The last page contains CDL data is selected in the very last pulse of state C. For example, a state A QPW signal, which indicates that the cells are almost at their target level, is used as a trigger for a pulse for concurrently programming the corresponding ADL information into both MLC and SLC before the ADL data is lost. The second page in the selected block that stores BDL information is selected in the last pulse used for programming State B (which is used as a trigger for a pulse for concurrently programming the corresponding BDL information into both MLC and SLC before the BDL data is lost). The last page contains CDL data and is selected in the last pulse used for programming State C (which is used as a trigger for a pulse for concurrently programming the corresponding CDL information into both MLC and SLC before the CDL data is lost). As noted, the aforementioned fourth latch (TDL) maintains the QPW information for the write progress for use in determining the last pulse for each state.

FIG. 6 illustrates this procedure via exemplary method 600. Beginning at block 602, the coupled SLC/TLC write logic activates QPW (or other suitable circuitry) to apply a series of pulses to the TLC cells to sequentially program state data from ADL, BDL and CDL latches to TLC wordlines or blocks. At 604, while applying a series of QPW pulses for programming State A to a TLC wordline or block, the coupled SLC/TLC write logic determines or detects when to apply the last pulse needed to program State A (indicating the corresponding cells are almost at their target level) and triggers the pulse using a common charge pump to program the ADL data to a first SLC wordline or block and concurrently program State A to TLC. The coupled SLC/TLC write logic then sets the corresponding code block entry to "inhibit," which may be the same value as "erased." At 606, while applying a next series of QPW pulses for programming State B to a TLC wordline or block, the coupled SLC/TLC write logic determines or detects when to apply the last pulse needed to program State B (indicating the corresponding cells are almost at their target level) and triggers the pulse using the common charge pump to program the BDL data to a second SLC wordline or block and concurrently program State B to TLC, then sets the corresponding code block entry to "inhibit." At 606, while applying a next series of QPW pulses for programming State C to a TLC wordline or block, the coupled SLC/TLC write logic determines or detects when to apply the last pulse needed to program State C (indicating the corresponding cells are almost at their target level) and triggers the pulse using the common charge pump to program the CDL data to a third SLC wordline or block and concurrently program State C to TLC, then sets the corresponding code block entry to "inhibit." At block 608, the coupled SLC/TLC write logic applies additional series of QPW pulses to the TLC block or wordline to program the remaining states (D-G) of the TLC block or wordline.

FIG. 7 illustrates the timing of the triggering of the three SLC pulses for programming the three SLC wordlines. Initially, cells are in the erase state. Beginning at time T1, a series of QPW pulses (not shown in the figure) are applied to push or move charges in the TLC cells to begin to program State A. During this interval of time, some cells are in transition from the Erase state to State A. At time T2, an LP programming pulse is generated by the charge pump and applied both to the TLC wordline or block to complete the programming of State A and to a first SLC wordline or block (not shown) to program the ADL data to that SLC wordline or block. As already explained, the QPW control circuitry applies a series of pulses having magnitudes that differ from one another by incrementally smaller amounts and determines when its next pulse will complete the programming of the corresponding TLC state. The last or final pulse is used as the triggering for concurrently programming the SLC wordline before data is lost (when code block values are reset to inhibit).

Next, beginning at time T3, a second series of QPW pulses (not shown in the figure) are applied to push or move charges in the TLC cells to begin to program State B. During this interval of time, some cells are in transition to State B. At time T4, an MP programming pulse is generated by the charge pump and applied both to the TLC wordline or block to complete the programming of State B and to a second SLC wordline or block (not shown) to program the BDL data to that SLC wordline or block. Beginning at time T5, a third series of QPW pulses (not shown in the figure) are applied to push or move charges in the TLC cells to begin to program State C. During this interval of time, some cells are in transition to State C. At time T6, a UP programming pulse is generated by the charge pump and applied both to the TLC wordline or block to complete the programming of State C and to a third SLC wordline or block (not shown) to program the CDL data to that SLC wordline or block. Thereafter, although not shown in FIG. 7, the additional states of the TLC wordline or block may be programmed.

Note that QPW is an example of a procedure for incrementally increasing the voltage of pulses for programming MLC. Other suitable procedures may instead be used. Moreover, although the main illustrative examples provided herein use the last pulse of a MLC state programming sequence to program both the MLC state and a SLC page (since that pulse has the highest voltage level and a common charge pump is employed), other pulses in the sequence might be used instead. Still further, in devices where different charge pumps are used for SLC and MLC, other timing procedures may be used.

Figure 8:
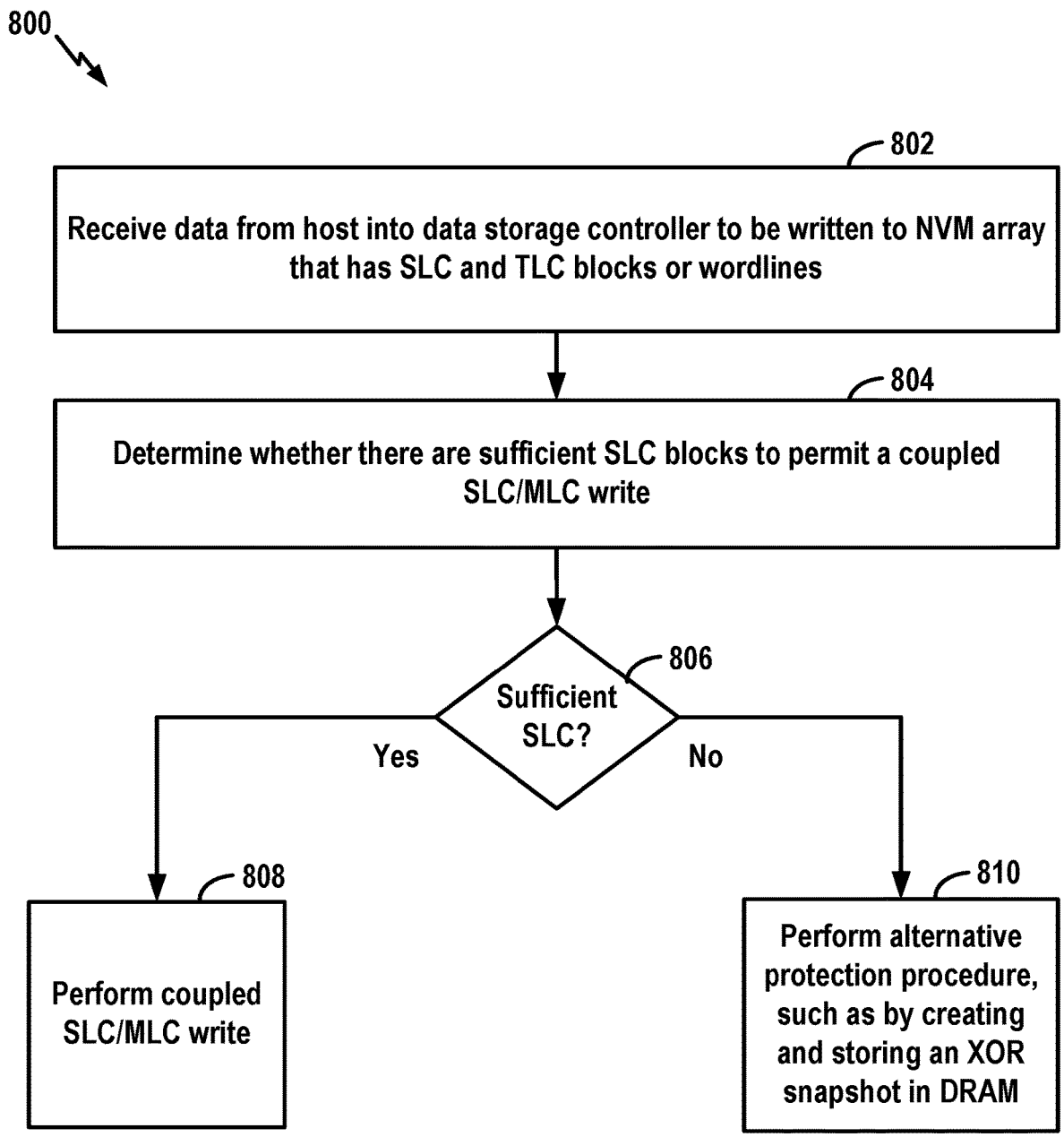
FIG. 8 is a flowchart illustrating an exemplary method to control a coupled SLC/TLC write based on SLC block availability.

FIG. 8 summarizes a procedure 800 (discussed above) wherein a XOR snapshot is used to protect data if there are insufficient SLC blocks to perform a full coupled SLC/MLC write. Briefly, beginning at block 802, the data storage controller receives data from the host to be written to an NVM array having SLC and TLC blocks or wordlines. At block 804, the data storage controller determines whether there are sufficient SLC blocks in the NVM array to permit a coupled SLC/MLC write. In making the determination, the data storage controller may take into account SLC blocks that may not be reported to the host within the exported capacity of the NVM array. Assuming that a sufficient amount of SLC memory is available, as indicated via decision block 806, the data storage controller at block 808 performs the coupled SLC/MLC write (or controls or permits the NVM array itself to perform the coupled SLC/MLC write). If there is not sufficient amount of SLC memory available, the data storage controller at block 810 performs an alternative protection procedure (or controls or permits the NVM array itself to perform the alternative procedure) such as by creating and storing a XOR snapshot in DRAM.

In the following, various general exemplary procedures and systems are described.

Additional Exemplary Methods and Apparatus

Figure 9:
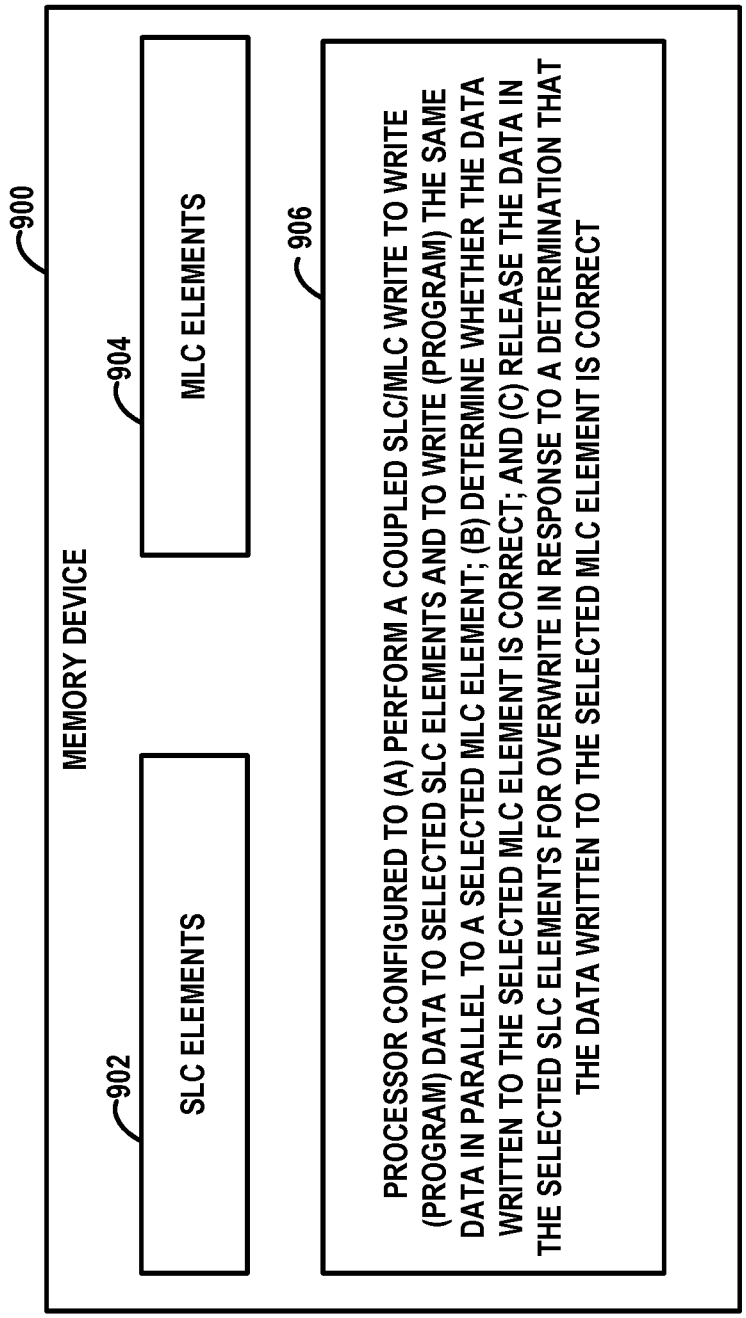
FIG. 9 is a schematic block diagram illustrating an exemplary memory device having SLC and MLC elements and a processor configured for coupled SLC/MLC writes.

FIG. 9 broadly illustrates a memory device 900 configured according to one or more aspects of the disclosure. The memory device 900 includes SLC elements 902 and MLC elements 904 (such as TLC or QLC storage elements). The memory device 900 also includes a processor 906 configured to (a) perform a coupled SLC/MLC write to write (program) data to selected SLC elements and to write (program) the same data in parallel to a selected MLC element; (b) determine whether the data written to the selected MLC element is correct; and (C) release the data in the selected SLC elements for overwrite (which may include erasure) in response to a determination that the data written to the selected MLC element is correct. Examples are described above. Additional examples are described below. As explained above, in at least some embodiments, by providing a coupled SLC/MLC write to program data to SLC elements and MLC elements in parallel, no overhead processing is required before or after the MLC write. In this manner, the SLC protection is "hidden" within the MLC write flow and does not degrade system performance. Other benefits or advantages may be achieved as well.

Figure 10:
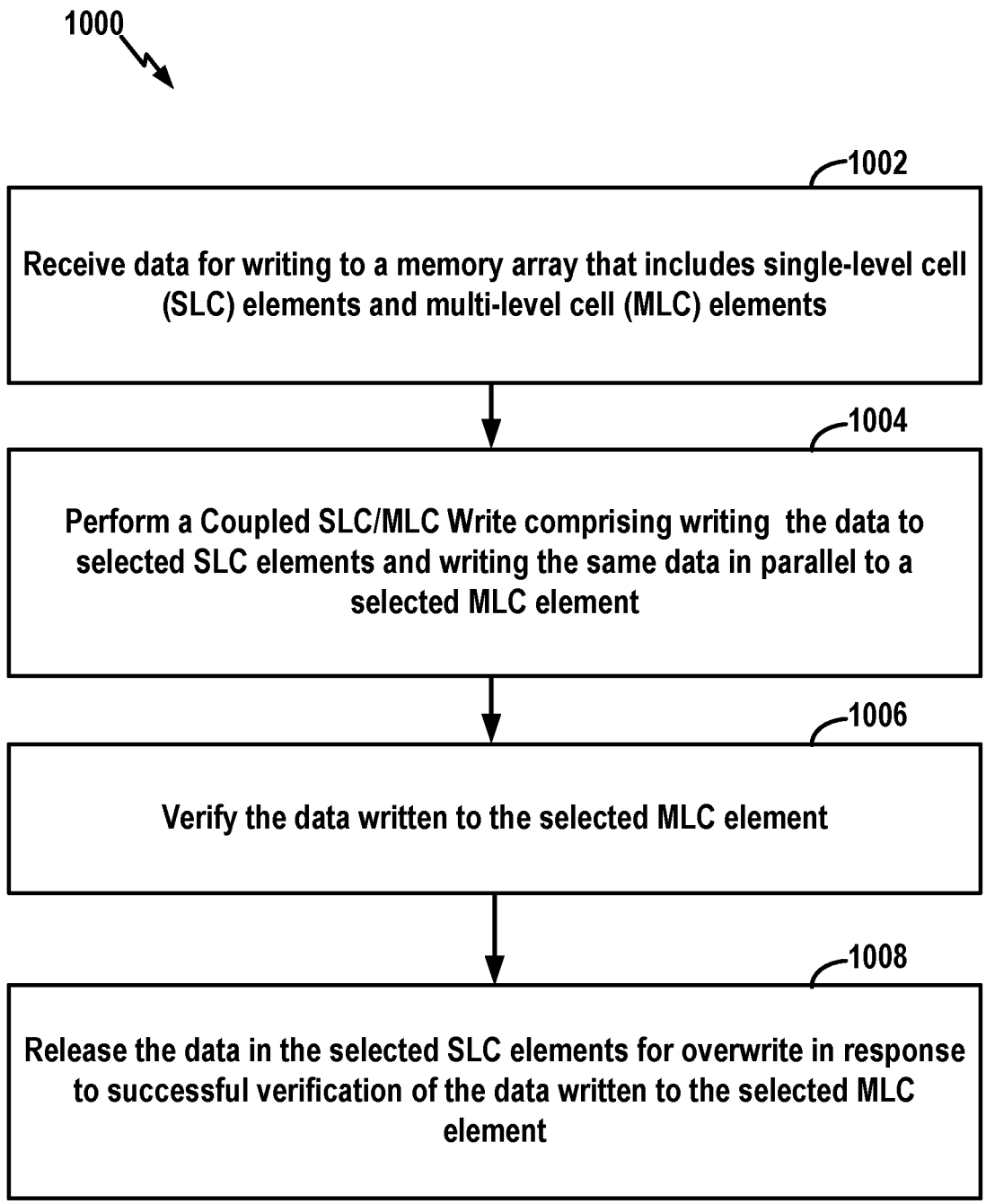
FIG. 10 is a flowchart that summarizes exemplary operations performed by an NVM array configured for use with coupled SLC/MLC writes.

FIG. 10 broadly illustrates a process 1000 in accordance with aspects of the disclosure. The process 1000 may take place within any suitable memory device having an NVM array that includes SLC elements and MLC elements. At block 1002, the memory device receives data for writing to the memory array that includes SLC elements and MLC elements. At block 1004, the memory device performs a coupled SLC/MLC write that comprises or includes writing (e.g. programming) the data to selected SLC elements and writing (e.g. programming) the same data in parallel to a selected MLC element. At block 1006, the memory device verifies the data written to the selected MLC element. At block 1008, the memory device releases the data in the selected SLC elements for overwrite (which may include erasure) in response to successful verification of the data written to the selected MLC element.

In some examples, means are provided for performing the various functions listed in FIG. 10. For example, an apparatus may be provided for use with an NVM array that includes SLC elements and MLC elements where the apparatus includes: means (such as input component 210 of FIG. 2) for receiving data for writing to the memory array; means (such as coupled SLC/MLC write component 214 of FIG. 2) for performing a coupled SLC/MLC write to write the data to selected SLC elements and to write the same data in parallel to a selected MLC element; means (such as write verification component 216 of FIG. 2) for verifying the data written to the selected MLC element; and means (such as release component 222 of FIG. 2) for releasing the data in the selected SLC elements for overwrite (which may include erasure) in response to successful verification of the data written to the selected MLC element.

Still further, in at least some examples, non-transitory machine-readable instructions may be provided for controlling the functions illustrated in FIG. 10 and/or other functions illustrated or described herein. For example, the instructions may include one or more of: instructions for receiving data for writing to the memory array; instructions for performing a coupled SLC/MLC write to write the data to selected SLC elements and to write the same data in parallel to a selected MLC element; instructions for verifying the data written to the selected MLC element; and instructions for releasing the data in the selected SLC elements for overwrite (which may include erasure) in response to successful verification of the data written to the selected MLC element.

Figure 11:
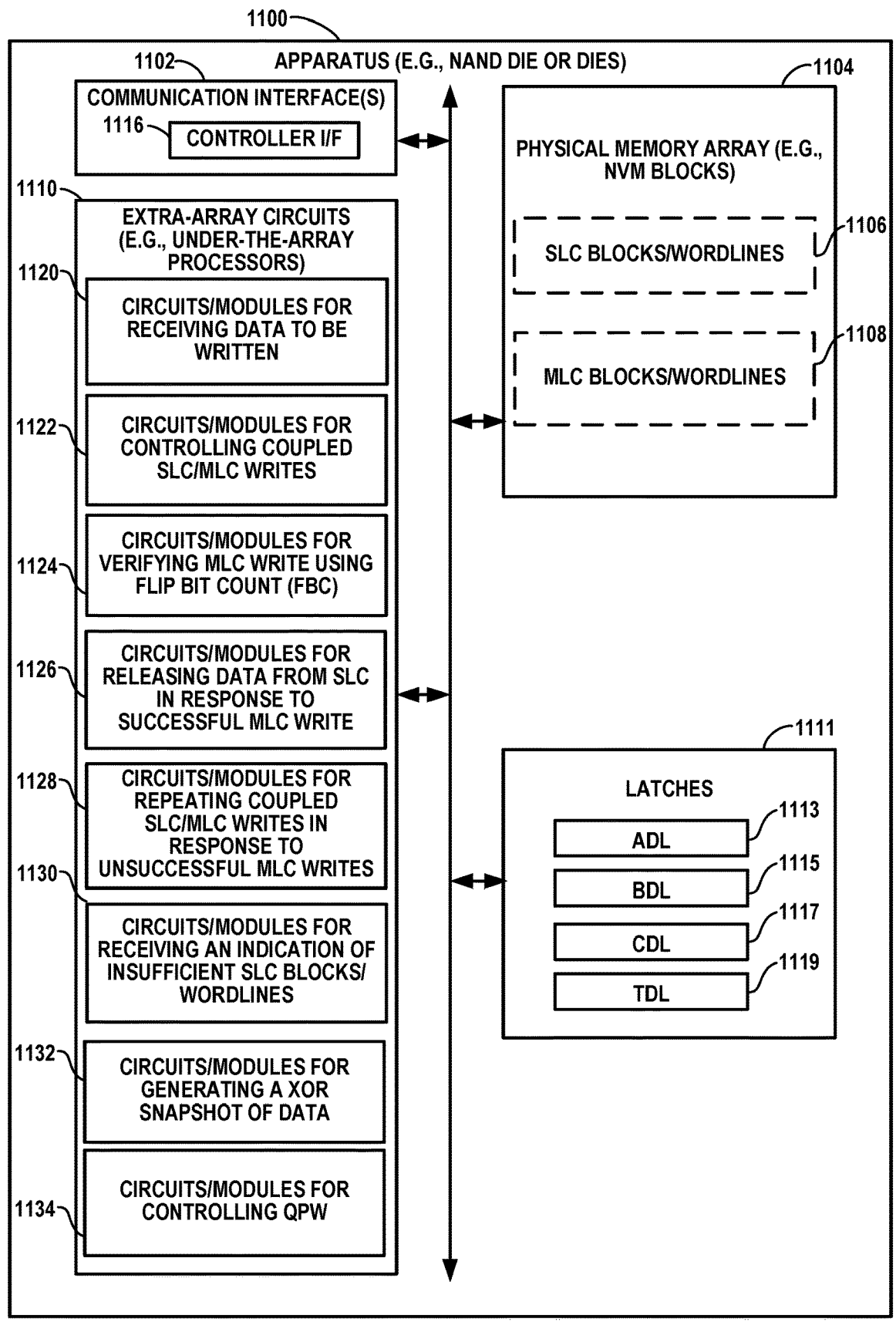
FIG. 11 is a schematic block diagram providing further details of an exemplary NVM apparatus and its components.

FIG. 11 illustrates an embodiment of an apparatus 1100 configured according to one or more aspects of the disclosure. The apparatus 1100, or components thereof, could embody or be implemented within one or more NAND dies or some other type of NVM device or memory chip that supports data storage. In various implementations, the apparatus 1100, or components thereof, could be a component of a processor, a controller, a computing device, a personal computer, a portable device, or workstation, a server, a personal digital assistant, a digital camera, a digital phone, an entertainment device, a medical device, a self-driving vehicle control device, aerial drone, smart glasses, smart watch or other wearable device, or any other electronic device that stores, processes or uses data.

The apparatus 1100 includes a communication interface 1102, a physical memory array (e.g., NVM blocks, pages or wordlines) 1104, and extra-array processing circuits 1110 (e.g. under-the-array or next-to-the-array circuits). These components can be coupled to and/or placed in electrical communication with one another via suitable components, represented generally by the connection lines in FIG. 11. Although not shown, other circuits such as timing sources, peripherals, voltage regulators, and power management circuits may be provided, which are well known in the art, and therefore, will not be described any further.

The communication interface 1102 provides a means for communicating with other apparatuses over a transmission medium. In some implementations, the communication interface 1102 includes circuitry and/or programming (e.g., a program) adapted to facilitate the communication of information bi-directionally with respect to one or more devices in a system. In some implementations, the communication interface 1102 may be configured for wire-based communication. For example, the communication interface 1102 could be a bus interface, a send/receive interface, or some other type of signal interface including circuitry for outputting and/or obtaining signals (e.g., outputting signal from and/or receiving signals into an SSD). The communication interface 1102 serves as one example of a means for receiving and/or a means for transmitting.

The physical memory array 1104 may represent one or more NAND blocks or pages including SLC blocks or wordlines 1106 and MLC blocks or wordlines 1108 (such as TLC or QLC blocks). Note that the SLC blocks and the MLC blocks may be on different dies that are within the same NVM array. The physical memory array 1104 may be used for storing data that are manipulated by the circuits 1110 or some other component of the apparatus 1100. The physical memory array 1104 may be coupled to the circuits 1110 such that the circuits 1110 can read or sense information from, and write or program information to, the physical memory array 1104. That is, the physical memory array 1104 can be coupled to the circuits 1110 so that the physical memory array 1104 is accessible by the circuits 1110. Data may be temporarily stored in one or more latches 1111, including, in this example, ADL 1113, BDL 1115, CDL 1117, and TDL 1119.

The circuits 1110 are arranged or configured to obtain, process and/or send data, control data access and storage, issue or respond to commands, and control other desired operations. For example, the circuits 1110 may be implemented as one or more processors, one or more controllers, and/or other structures configured to perform functions. According to one or more aspects of the disclosure, the circuits 1110 may be adapted to perform any or all of the extra-array features, processes, functions, operations and/or routines described herein. For example, the circuits 1110 may be configured to perform any of the steps, functions, and/or processes described with reference to the other figures. As used herein, the term "adapted" in relation to the processing circuits 1110 may refer to the circuits being one or more of configured, employed, implemented, and/or programmed to perform a particular process, function, operation and/or routine according to various features described herein. The circuits may include a specialized processor, such as an ASIC that serves as a means for (e.g., structure for) carrying out any one of the operations described with reference to the other figures. The circuits serve as an example of a means for processing. In various implementations, the circuits may provide and/or incorporate, at least in part, functionality described above for the coupled SLC/MLC write in various embodiments shown, including. e.g., logic 204 of FIG. 2.

According to at least one example of the apparatus 1100, the processing circuit 1110 may include one or more of: circuit/modules 1120 configured for receiving data to be written; circuits/modules 1122 configured for controlling or performing coupled SLC/MLC writes, such as a coupled SLC/TLC write; circuits/modules 1124 configured for verifying the MLC write, such as by applying write verification pulses to determine a FBC for comparison against a threshold indicative or a data storage error; circuits/modules 1126 configured for releasing data from SLC in response to a successful MLC write; circuits/modules 1128 configured for repeating the coupled SLC/MLC write in response to an unsuccessful MLC write; circuits/modules 1130 configured for receiving an indication of insufficient SLC blocks/wordlines from a data storage controller (i.e. an insufficient number of blocks to perform a coupled SLC/MLC write); circuits/modules 1132 configured for generating a XOR snapshot of the data (if the indication of insufficient SLC blocks/wordlines is received) for use as an alternative protection scheme; and circuits/modules 1134 configured for controlling QPW, including circuits for determining a last pulse needed to program a particular state (as explained above) for use in timing the SLC pulses.

In at least some examples, means may be provided for performing the functions illustrated in FIG. 11 and/or other functions illustrated or described herein. For example, the means may include one or more of: means, such as circuit/modules 1120, for receiving data to be written; means, such as circuits/modules 1122, for controlling or performing coupled SLC/MLC writes, such as a coupled SLC/TLC write; means, such as circuits/modules 1124, for verifying the MLC write, such as by applying write verification pulses to determine a FBC for comparison against a threshold indicative or a data storage error; means, such as circuits/modules 1126, for repeating the coupled SLC/MLC write in response to an unsuccessful MLC write; means, such as circuits/modules 1128, for repeating the coupled SLC/MLC write in response to an unsuccessful MLC write; means, such as circuits/modules 1130, for receiving an indication of insufficient SLC blocks/wordlines from a data storage controller (i.e. an insufficient number of blocks to perform a coupled SLC/MLC write); means, such as circuits/modules 1132, for generating a XOR snapshot of the data (if the indication of insufficient SLC blocks/wordlines is received) for use as an alternative protection scheme; and means, such as circuits/modules 1134, for controlling QPW, including means for determining a last pulse needed to program a particular state (as explained above) for use in timing the SLC pulses.

Additional Aspects

At least some of the processing circuits described herein may be generally adapted for processing, including the execution of programming code stored on a storage medium. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

At least some of the processing circuits described herein may be arranged to obtain, process and/or send data, control data access and storage, issue commands, and control other desired operations. The processing circuits may include circuitry configured to implement desired programming provided by appropriate media in at least one example. For example, the processing circuits may be implemented as one or more processors, one or more controllers, and/or other structure configured to execute executable programming. Examples of processing circuits may include a general purpose processor, a digital signal processor (DSP), an ASIC, a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. At least some of the processing circuits may also be implemented as a combination of computing components, such as a combination of a controller and a microprocessor, a number of microprocessors, one or more microprocessors in conjunction with an ASIC and a microprocessor, or any other number of varying configurations. The various examples of processing circuits noted herein are for illustration and other suitable configurations within the scope of the disclosure are also contemplated.

Aspects of the subject matter described herein can be implemented in any suitable NVM, including NAND flash memory such as 3D NAND flash memory. More generally, semiconductor memory devices include working memory devices, such as DRAM or SRAM devices, NVM devices, ReRAM, EEPROM, flash memory (which can also be considered a subset of EEPROM), ferroelectric random access memory (FRAM), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two dimensional memory structure or a three-dimensional memory structure.

In a two dimensional memory structure, the semiconductor memory elements are arranged in a single plane or a single memory device level. Typically, in a two dimensional memory structure, memory elements are arranged in a plane (e.g., in an x-y direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon. The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the z direction is substantially perpendicular and the x and y directions are substantially parallel to the major surface of the substrate). As a non-limiting example, a three dimensional memory structure may be vertically arranged as a stack of multiple two dimensional memory device levels. As another non-limiting example, a three-dimensional memory array may be arranged as multiple vertical columns (e.g., columns extending substantially perpendicular to the major surface of the substrate, i.e., in the z direction) with each column having multiple memory elements in each column. The columns may be arranged in a two dimensional configuration, e.g., in an x-y plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-y) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two-dimensional and three-dimensional exemplary structures described but cover all relevant memory structures within the spirit and scope of the subject matter as described herein and as understood by one of skill in the art.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" or "one or more of A, B, or C" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" or "one or more of A, B, or C" is intended to cover A, B, C, A-B, A-C, B-C, and A-B-C, as well as multiples of the same members (e.g., any lists that include AA, BB, or CC) Likewise, "at least one of: A, B, and C" or "one or more of A, B, or C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A memory device comprising:
    a non-volatile memory (NVM) array including single-level cell (SLC) elements and multi-level cell (MLC) elements; and
    a processor configured to
        perform a first coupled SLC/MLC write to write data to a first set of selected SLC elements and to write the same data in parallel to a selected MLC element,
        determine whether the data written to the selected MLC element is correct,
        release the data in the selected SLC elements for overwrite in response to a determination that the data written to the selected MLC element is correct,
        recover the data, in response to a determination that the data written to the selected MLC element is not correct, by reading the data from the selected SLC elements, and
        perform a second coupled SLC/MLC write to write the recovered data to another selected MLC element and to a second set of selected SLC elements.

2. The memory device of claim 1, wherein the processor is further configured to:
    determine whether the data written to the selected MLC element during the first coupled SLC/MLC write is correct using write verification.

3. The memory device of claim 1, wherein the processor is further configured to determine whether the data written to the selected MLC element during the first coupled SLC/MLC write is correct by comparing a failed bit count (FBC) to a threshold indicative of a write error.

4. The memory device of claim 1, wherein the selected MLC element is a two-level MLC element and wherein the processor is further configured to perform the first coupled SLC/MLC write to write the data to at least two of the selected SLC elements of the first set and to write the same data in parallel to the two-level MLC element.

5. The memory device of claim 1, wherein the selected MLC element is a triple-level cell (TLC) element and wherein the processor is further configured to perform the first coupled SLC/MLC write to write the data to at least three of the selected SLC elements of the first set and to write the same data in parallel to the selected TLC element.

6. The memory device of claim 1, wherein the selected MLC element is a quad-level cell (QLC) element and wherein the processor is further configured to perform the first coupled SLC/MLC write to write the data to at least four of the selected SLC elements of the first set and to write the same data in parallel to the selected QLC element.

7. The memory device of claim 1, wherein the processor is further configured to generate an XOR copy of the data in response to a determination of insufficient remaining SLC blocks in the NVM array to complete the first coupled SLC/MLC write.

8. The memory device of claim 1, wherein the processor is further configured to perform the first coupled SLC/MLC write by:
    detecting when to apply a last pulse to program a particular state of the selected MLC element;
    obtaining data corresponding to the particular state from a latch;
    applying the last pulse to concurrently program the data corresponding to the particular state in a first one of the selected SLC elements of the first set and in the selected MLC element; and
    changing the data corresponding to the particular state in the latch to a value indicating inhibition of further programming of the particular state.

9. The memory device of claim 8, wherein the selected MLC element is a triple-level cell (TLC) element, the particular state is a first state, the data corresponding to the first state is lower page data for the TLC element, and the latch is a lower page data latch.

10. The memory device of claim 8, further comprising a quick pass write circuit configured to detect the last pulse for programming a particular state of the selected MLC element.

11. A method for use with a memory array that includes single-level cell (SLC) elements and multi-level cell (MLC) elements, the method comprising:
    receiving data for writing to the memory array;

performing a first coupled SLC/MLC write comprising writing the data to a first set of selected SLC elements and writing the same data in parallel to a selected MLC element;
verifying the data written to the selected MLC element;
releasing the data in the selected SLC elements for overwrite in response to successful verification of the data written to the selected MLC element;
recovering the data in response to unsuccessful verification of the data written to the selected MLC element by reading the data from the selected SLC elements; and
performing a second coupled SLC/MLC write to write the recovered data to another selected MLC element and to a second set of selected SLC elements.

12. The method of claim 11, wherein the selected MLC element comprises one or more of a two-level MLC element, a triple-level cell (TLC) element, and a quad-level cell (QLC) element.

13. The method of claim 11, further comprising determining whether the data written to the selected MLC element during the first coupled SLC/MLC write is correct using write verification.

14. The method of claim 11, further comprising determining whether the data written to the selected MLC element during the first coupled SLC/MLC write is correct by comparing a failed bit count (FBC) obtained using the write verification to a threshold indicative of a write error.

15. The method of claim 11, wherein performing the first coupled SLC/MLC write further comprises:
detecting when to apply a last pulse to program a particular state of the selected MLC element;
obtaining data corresponding to the particular state from a latch;
applying the last pulse to concurrently program the data corresponding to the particular state in a first one of the selected SLC elements of the first set and in the selected MLC element; and
changing the data corresponding to the particular state in the latch to values indicating inhibition of further programming of the particular state.

16. The method of claim 15, wherein the selected MLC element is a triple-level cell (TLC) element, the particular state is a first state, the data corresponding to the first state is lower page data for the TLC element, and the latch is a lower page data latch.

17. The method of claim 16, wherein performing the first coupled SLC/MLC write further comprises:
detecting when to apply a last pulse to program a second state of the selected TLC element;
obtaining middle page data from a middle page data latch;
applying the last pulse to concurrently program the middle page data in a second one of the selected SLC elements of the first set and in the TLC element; and
changing the middle page data in the middle page data latch to values indicating inhibition of further programming of the second state.

18. The method of claim 17, wherein performing the first coupled SLC/MLC write further comprises:
detecting when to apply a last pulse to program a third state of the selected TLC element;
obtaining upper page data from an upper page data latch;
applying the last pulse to concurrently program the upper page data in a third one of the selected SLC elements of the first set and in the TLC element; and
changing the upper page data in the upper page data latch to values indicating inhibition of further programming of the third state.

19. An apparatus for use with a memory array that includes single-level cell (SLC) elements and multi-level cell (MLC) elements, the apparatus comprising:
means for performing a first coupled SLC/MLC write to write data to a first set of selected SLC elements and to write the same data in parallel to a selected MLC element;
means for verifying the data written to the selected MLC element;
means for releasing the data in the selected SLC elements for overwrite in response to successful verification of the data written to the selected MLC element;
means for recovering the data in response to unsuccessful verification of the data written to the selected MLC element by reading the data from the selected SLC elements; and
means for performing a second coupled SLC/MLC write to write the recovered data to another selected MLC element and to a second set of selected SLC elements.

20. A memory device comprising:
a non-volatile memory (NVM) array including single-level cell (SLC) elements and multi-level cell (MLC) elements; and
a processor configured to
perform a first coupled SLC/MLC write to write data to selected SLC elements and to write the same data in parallel to a selected MLC element,
determine whether the data written to the selected MLC element is correct,
release the data in the selected SLC elements for overwrite in response to a determination that the data written to the selected MLC element is correct, and
generate an XOR copy of the data in response to a determination of insufficient remaining SLC blocks in the NVM array to complete the coupled SLC/MLC write.

21. The memory device of claim 20, wherein the processor is further configured to:
recover the data, in response to a determination that the data written to the selected MLC element during the first coupled SLC/MLC write is not correct, by reading the data from the selected SLC elements, and
perform a second coupled SLC/MLC write to write the recovered data to another selected MLC element and to a second set of selected SLC elements.

22. The memory device of claim 20, wherein the processor is further configured to perform the first coupled SLC/MLC write by:
detecting when to apply a last pulse to program a particular state of the selected MLC element;
obtaining data corresponding to the particular state from a latch;
applying the last pulse to concurrently program the data corresponding to the particular state in a first one of the selected SLC elements and in the selected MLC element; and
changing the data corresponding to the particular state in the latch to a value indicating inhibition of further programming of the particular state.

\* \* \* \* \*